(12) United States Patent
Hufen et al.

(10) Patent No.: US 10,138,370 B2
(45) Date of Patent: Nov. 27, 2018

(54) POLYCARBONATE COMPOSITIONS HAVING IMPROVED ADHESION TO POLYURETHANE LAYERS

(71) Applicant: COVESTRO DEUTSCHLAND AG, Leverkusen (DE)

(72) Inventors: Ralf Hufen, Duisburg (DE); Thomas Eckel, Dormagen (DE); Sven Hobeika, Solingen (DE); Timo Kuhlmann, Leichlingen (DE); Jan Helmig, Dormagen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 2 days.

(21) Appl. No.: 15/027,180

(22) PCT Filed: Oct. 15, 2014

(86) PCT No.: PCT/EP2014/072119
§ 371 (c)(1),
(2) Date: Apr. 4, 2016

(87) PCT Pub. No.: WO2015/055719
PCT Pub. Date: Apr. 23, 2015

(65) Prior Publication Data
US 2016/0244609 A1    Aug. 25, 2016

(30) Foreign Application Priority Data
Oct. 18, 2013 (EP) ..................... 13189299

(51) Int. Cl.
| | |
|---|---|
| *B32B 27/40* | (2006.01) |
| *B32B 27/36* | (2006.01) |
| *C08L 55/02* | (2006.01) |
| *C08L 67/03* | (2006.01) |
| *C08L 69/00* | (2006.01) |
| *C08L 67/02* | (2006.01) |
| *B32B 27/08* | (2006.01) |
| *B29C 45/16* | (2006.01) |

(52) U.S. Cl.
CPC ............ *C08L 69/00* (2013.01); *B32B 27/08* (2013.01); *B32B 27/36* (2013.01); *B32B 27/365* (2013.01); *B32B 27/40* (2013.01); *C08L 67/02* (2013.01); *C08L 69/005* (2013.01); *B29C 45/1679* (2013.01); *B32B 2255/10* (2013.01); *B32B 2255/26* (2013.01); *B32B 2307/306* (2013.01); *B32B 2307/3065* (2013.01); *B32B 2307/558* (2013.01)

(58) Field of Classification Search
CPC ........................................................ C08L 55/02
USPC .............. 524/504, 508, 511, 537; 428/423.1
See application file for complete search history.

(56) References Cited

U.S. PATENT DOCUMENTS

| | | | | |
|---|---|---|---|---|
| 6,630,527 | B2 * | 10/2003 | Pierre ................ | C08K 5/3435 524/100 |
| 8,222,351 | B2 * | 7/2012 | DeRudder ............. | C08L 69/00 524/261 |
| 2002/0058716 | A1 | 5/2002 | Wittmann et al. | |
| 2006/0151911 | A1 | 7/2006 | Zollner et al. | |
| 2011/0129631 | A1 * | 6/2011 | Van Nuffel ........... | C08L 51/003 428/36.92 |
| 2012/0053271 | A1 | 3/2012 | Feldermann et al. | |

FOREIGN PATENT DOCUMENTS

| | | |
|---|---|---|
| DE | 102006033059 A1 | 1/2008 |
| DE | 102009058180 A1 * | 6/2011 |
| DE | 102009058180 A1 * | 6/2011 |
| EP | 0 363 608 | 4/1990 |
| EP | 2089207 B1 | 5/2012 |
| WO | 9920464 A1 | 4/1999 |
| WO | 2006/072366 | 7/2006 |

OTHER PUBLICATIONS

International Search Report of PCT/EP2014/071852 dated Feb. 17, 2015.

* cited by examiner

*Primary Examiner* — Tae H Yoon
(74) *Attorney, Agent, or Firm* — K&L Gates LLP

(57) ABSTRACT

The present invention relates to compositions and composite components formed from these compositions and a polyurethane layer, which are notable for improved adhesion between the two layers, and a process for producing the composite components.

22 Claims, 1 Drawing Sheet

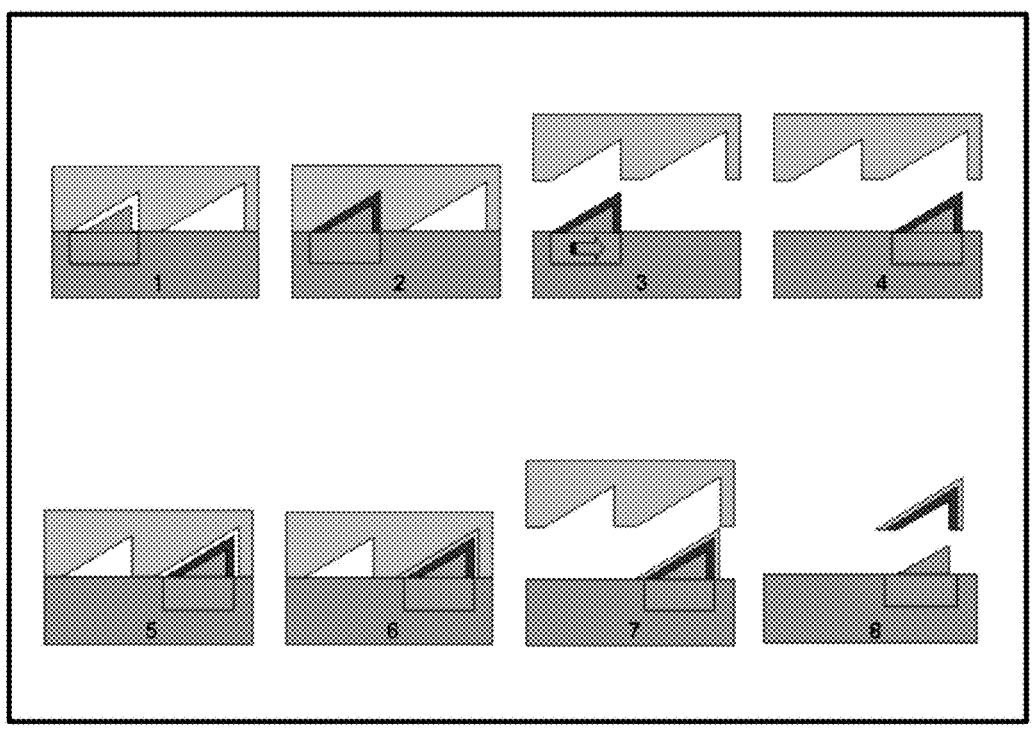

POLYCARBONATE COMPOSITIONS HAVING IMPROVED ADHESION TO POLYURETHANE LAYERS

CROSS REFERENCE TO RELATED APPLICATIONS

This application is a § 371 National Stage Application of PCT/EP2014/072119, filed Oct. 15, 2014, which claims priority to EP 13189299.4, filed Oct. 18, 2013

BACKGROUND

Field of the Invention

The present invention provides polycarbonate compositions having improved adhesion to polyurethane systems, composite systems comprising these polycarbonate compositions and polyurethane systems, and also shaped bodies formed from these composite systems and processes for producing the composite systems. The polycarbonate compositions are notable not only for good adhesion to the polyurethane system after a temperature variation test but also for high low-temperature toughness, high heat distortion resistance, high modulus of elasticity, and also high elongation at break and low overall shrinkage.

Description of Related Art

WO 2006/072366 A1 describes a process for forming and coating a substrate in a mould having at least two cavities. The process comprises the steps of:
a) forming a substrate in a first cavity of the mould,
b) introducing the substrate produced in the previous step into a second cavity of the mould and
c) coating the substrate in the second cavity with a coating material, the coating being effected under elevated pressure.

By way of example and with preference, polyurethane coating materials and PC+ABS substrates (polycarbonate+acrylonitrile-butadiene-styrene substrates) are mentioned. No pointers are given in this application as to the influence of the carrier material composition on the adhesive properties of the material composite.

EP 2089207 A1 discloses a process for producing a composite component, especially comprising an injection moulding and a polyurethane element, comprising the steps of
a) producing a carrier component,
b) moving or transferring the carrier component to an opened cavity of a mould,
c) closing the mould to a predetermined position, creating an enlarged cavity having a first size,
d) generating a reduced pressure in the enlarged cavity of the first size,
e) introducing a flooding material into the enlarged cavity and
f) conducting an embossing step simultaneously with the introduction and/or after the introduction of the flooding material, while at least slightly reducing the size of the cavity.

For improvement of the composite adhesion, activation of the surface of the thermoplastic by flaming, plasma treatment or gas is described here. No pointers are given in this publication as to the influence of the carrier material composition on the adhesion properties of the material composite.

DE 10 2006 033 059 A1 discloses a process for producing plastic interior components. In this process, in a first step, the carrier is formed in a first mould, then the first mould is at least partly replaced by a second mould and then the top layer is formed on the carrier in a second step. The carrier material used is a hard component, e.g. PA+ABS blends (polyamide+acrylonitrile-butadiene-styrene) or PC+ABS blends (polycarbonate+acrylonitrile-butadiene-styrene), and the top layer used is a soft component, preferably polyurethane foam. No pointers are given in the application as to the influence of the composition of the carrier materials on the composite properties of the components thus produced. Instead, DE 10 206 033 059 A1 likewise proposes improving the adhesion by preparing the surface by primers or by laser, corona or plasma treatment.

WO 99/20464 discloses composites of at least two different polymer materials bonded directly to one another: a) a thermoplastic polymer or a thermoplastic mixture of polymers which contain at least one polar compound of at least one of the metals of main groups 1 to 5 or of transition groups 1 to 8 of the Periodic Table as ultrafinely distributed inorganic powder and b) polyurethane present in the form of a foam, coating material or compact material. No adhesion promoter layer is required for the composite. No pointers are given in this publication with regard to the influence of the carrier material composition in terms of ABS content and rubber content on the adhesion properties of the material composite.

DE 101 09 226 A1 discloses a polycarbonate composition comprising a) aromatic polycarbonate and/or polyester carbonate, b) graft polymer and c) copolymer of styrene and a monomer containing carboxyl groups, where said copolymer has a mean molecular weight Mw of $>=10\,500$ g/mol, and where said copolymer may contain one or more vinyl monomers. Component C is preferably a copolymer of styrene and maleic anhydride. DE 101 09 226 A1 further discloses composite components comprising at least one first layer (1) and a second layer (2), in which layer (1) includes at least one polycarbonate composition (as specified in a, b and c) and layer (2) contains at least one polyurethane. It is a feature of the composite that the decrease in foam adhesion between layer (1) and layer (2) is at most 35% after a double alternating climate test. No pointers are given in this publication as to the influence of the carrier material composition in terms of ABS content and rubber content on the adhesion properties of the material composite.

SUMMARY

It was an object of the present invention to provide improved polycarbonate compositions having good adhesion to polyurethane systems after a temperature variation test, composite systems comprising these polycarbonate compositions and polyurethane layers, and shaped bodies formed from these composite systems. Polycarbonate compositions should be notable for good adhesion to the polyurethane system after a temperature variation test, and for a high low-temperature toughness, high heat distortion resistance, high modulus of elasticity, and also high elongation at break and low overall shrinkage.

In addition, a process for producing these composite components is to be provided.

The polyurethane layer may serve, for example, to improve the surface properties, for example scratch resistance, self-healing, weathering stability, tactile properties, optical properties, sound insulation and thermal insulation, of the composite components.

The object of the present invention is achieved by polycarbonate compositions comprising A) 30 to 45 parts by weight, preferably 32 to 45 parts by weight, more preferably 35 to 45 parts, by weight of at least one polymer selected from the group consisting of aromatic polycarbonate and aromatic polyester carbonate, B) 32 to 54 parts by weight, preferably 32 to 50 parts by weight, more preferably 32 to 45 parts by weight, of at least one polyalkylene terephthalate, preferably a polybutylene terephthalate, C) 16 to 23 parts by weight, preferably 17 to 22 parts by weight, more preferably 18 to 21 parts by weight, of at least one mixture comprising at least one polybutadiene-based graft polymer and at least one butadiene-free vinyl (co) polymer, D) 0.1 to 20.0 parts by weight, preferably 0.2 to 15.0 parts by weight, more preferably 0.3 to 10.0 parts by weight (based in each case on the sum total of components A to C), of at least one polymer additive, where the polybutadiene content based on the sum total of the parts by weight of components A to C is 8% to 18% by weight, preferably 9% to 17% by weight, more preferably 10% to 16% by weight, and where the total content of butadiene-free vinyl (co) polymer from component C based on the sum total of the parts by weight of components A to C is 3% to 12% by weight, preferably 4% to 11% by weight, more preferably 5% to 10% by weight, and where the sum total of the parts by weight of components A to C in the polycarbonate composition is normalized to 100.

BRIEF DESCRIPTION OF THE DRAWINGS

A process according to the invention for producing the inventive composite components described in the examples is shown in FIG. 1 for better illustration.

DETAILED DESCRIPTION OF A PREFERRED EMBODIMENT

While the ranges of preference mentioned can be combined freely with one another, preference is given to combining the respective first, middle and last ranges with one another.

In a further preferred embodiment, the polycarbonate compositions are free of fillers and reinforcers, for example talc, glass fibres or carbon fibres (optionally including ground fibres), (hollow) glass or ceramic beads, mica, kaolin, $CaCO_3$ and glass flakes.

In a further preferred embodiment, the polycarbonate compositions comprise

A) 30 to 45 parts by weight of at least one polymer selected from the group consisting of aromatic polycarbonate and aromatic polyester carbonate, B) 32 to 54 parts by weight of at least one polybutylene terephthalate, C) 16 to 23 parts by weight of at least one mixture comprising at least one polybutadiene-based graft polymer and at least one butadiene-free vinyl (co)polymer, D) 0.1 to 20.0 parts by weight (based in each case on the sum total of components A to C) of at least one polymer additive, where the polybutadiene content based on the sum total of the parts by weight of components A to C is 8% to 18% by weight, and where the total content of butadiene-free vinyl (co) polymer from component C based on the sum total of the parts by weight of components A to C is 3% to 12% by weight, and where the graft polymer of component C, based on the graft polymer, comprises 20% to 55% by weight of at least one vinyl monomer and 80% to 45% by weight of one or more polybutadiene-based graft bases, and where the graft polymer is prepared by emulsion polymerization, and where the graft base of the polybutadiene-based graft polymer has a median particle size ($d_{50}$) of 0.2 to 1.0 μm, measured by ultracentrifuge methodology, and where at least two stabilizers are used in component D, where the second stabilizer comprises a Brønsted-acidic compound, and where the sum total of the parts by weight of components A to C in the polycarbonate composition is normalized to 100.

In a further preferred embodiment, the polycarbonate compositions are free from flame retardants and from flame retardant synergists such as anti-dripping agents.

In a further preferred embodiment, the polycarbonate compositions consist only of components A, B, C and D.

In addition and with preference, the object of the present invention is achieved by composite components comprising a) a carrier composed of a polycarbonate composition as specified above
b) at least one polyurethane layer.

Said polyurethane layer may, for example, be a PU coating material, a PU foam or else a compact PU skin having polyurethane layer thicknesses of, for example, 1 μm up to 20 cm.

In a preferred embodiment, the polyurethane layer is a coating material having a layer thickness of 1-1000 μm, further preferably 10-500 μm and more preferably 50-300 μm.

In a further preferred embodiment, the polyurethane layer is a foam having a layer thickness of 1 mm-20 cm, further preferably 1 mm-10 cm and more preferably 1 mm-1 cm.

In a further preferred embodiment, the polyurethane layer is a compact skin having a layer thickness of 0.5 mm-10.0 mm, preferably 0.5 mm-5.0 mm and more preferably 1.0 mm-4.0 mm.

The composite components can in principle be produced in any known manner.

Preferably, the polyurethane layer is produced by full polymerization of a reactive polyurethane raw material mixture comprising at least one polyisocyanate component,
at least one polyfunctional H-active compound, and
optionally at least one polyurethane additive and/or processing aid, in direct contact with the carrier which has been shaped beforehand from the thermoplastic composition and solidified.

The carrier component may be prefabricated, for example, from the thermoplastic PC+ABS composition and the reactive polyurethane raw material mixture may be applied thereto and reacted fully. According to the reactivity of the polyurethane reaction components, they may already have been premixed or may be mixed in a known manner during the application. The application can be effected by methods including spraying, knife-coating or calendering.

If foamed composites are to be produced, it is possible in a manner known per se to introduce the reaction mixture into a mould containing the previously formed and solidified support component. Optionally, the mould may also contain a further decorative layer (often called "skin") composed of, for example, polyvinyl chloride (PVC), thermoplastic polyolefins (TPO), thermoplastic polyurethane (TPU) or sprayable polyurethane skin. In the mould, the foamable reaction mixture foams in contact with the carrier component and any decorative layer, and forms the composite component. The in-mould foaming can be performed in such a way that the composite component has a cell structure at its surface. Alternatively, it can be conducted in such a way that the composite component has a compact skin and a cellular core (integral foams). The polyurethane components can be introduced into the mould with high-pressure or low-pressure machines.

Polyurethane foams can also be produced as slabstock foam.

Polyurethane composites can also be produced in sandwich mode. The method may be configured either as a depot method or a shell-building method. Both the depot method and the shell-building method are known per se. In the depot method (filling mode), two half-shells (for example outer layers made from polymers) are prefabricated and inserted into a mould, and the cavity between the shells is filled by foaming with the PUR foam. In shell-building mode, a core of PUR foam is placed in a mould and then encased with a suitable shell material, for example with one of the thermoplastics mentioned. In the production of sandwich composites, preference is given to shell-building mode.

In a preferred embodiment of the invention, the composite components are produced by a process in which
  (i) in a first process step the melt of the thermoplastic composition is injected into a first mould cavity and then cooled,
  (ii) in a second process step the thermoplastic component is transferred into a larger cavity and a defined gap is produced thereby,
  (iii) in the third process step the gap which thus results between the thermoplastic component and the mould surface of the enlarged cavity is injected with a reactive polyurethane raw material mixture comprising
    at least one polyisocyanate component,
    at least one polyfunctional H-active compound, and
    optionally at least one polyurethane additive and/or processing aid,
the polyurethane raw material mixture polymerizing fully in direct contact with the surface of the thermoplastic carrier to give a compact polyurethane layer or to give a polyurethane foam layer, and
  (iv) in the fourth process step the composite component is demoulded from the mould cavity.

In a further preferred embodiment of the invention, process steps (i) to (iv) follow one another in immediate succession in the composite component production.

If required, the larger cavity is treated with a separating agent prior to process step (iii).

The immediate succession of the process steps prevents the workpiece from cooling down to room temperature during the process. This achieves a reduction in the production times and a higher energy efficiency of the overall process.

Process steps (ii) and (iii) can be repeated at least once with variation of the polyurethane system, in which case one or more polyurethane layers are applied to one or both sides of the carrier, so as to result in a composite component composed of thermoplastic carrier and at least two identical or different PU components which may optionally also have a more than two-layer structure.

Before the demoulding of the workpiece in steps (ii) and (iv), the workpiece is cooled down until it is dimensionally stable.

To produce the gap in process step (ii), it is possible to open the injection mould and subsequently to exchange half of the injection mould cavity for a new half with greater cavity dimensions, or to move the component from the first mould cavity to a second cavity which is larger in terms of its cavity dimensions or to a second mould, or to open up the first cavity to create a gap.

The movement of the substrate in process step (ii) can be effected by known processes, as employed, for example, in multicolour injection moulding. Typical methods are firstly movement with a turntable, a turning plate, a sliding cavity or an index plate, or comparable methods in which the substrate remains on a core. If the substrate for movement remains on the core, this has the advantage that the position is defined accurately even after the movement. Secondly, the prior art discloses methods for moving a substrate in which the substrate is removed from a cavity, for example with the aid of a handling system, and placed into another cavity. Movement with removal of the substrate offers greater freedom of configuration in the coating operation, for example in the generation of an edge fold or masked regions.

In a preferred embodiment, in the first process step, a thermoplastic polymer composition which at room temperature and more preferably also at −20° C. has high toughness in the notched impact test to ISO 180-1A, characterized by a notched impact resistance value of greater than 30 kJ/m$^2$, is used.

The reactive polyurethane raw material mixtures used in the production of the inventive composite components preferably have an index of >80 to <125, further preferably >90 to <120, and more preferably of 100 to 110.

The index is defined as the percentage ratio of the amount of isocyanate actually used to the calculated stoichiometric amount in the case of complete reaction with the H-active polyfunctional component, i.e. index=(amount of isocyanate used/calculated stoichiometric amount of isocyanate)*100.

In an alternative embodiment, rather than the reactive polyurethane raw material mixture, it is also possible to use a thermoplastic polyurethane.

In a further preferred embodiment, the surface of the injection mould in contact with the thermoplastic polymer composition is heated in process step (iii) to a temperature in the range of 50 to 100° C., preferably 55 to 95° C., and more preferably 60 to 90° C.

In a further preferred embodiment, the surface of the injection mould in contact with the reactive polyurethane mixture is heated in process step (iii) to a temperature in the range of 50 to 160° C., preferably 50 to 120° C., further preferably 60 to 110° C., and more preferably 60 to 90° C.

In a further preferred embodiment, the surface of the injection mould in contact with the thermoplastic polymer composition is heated in process step (iii) to a temperature in the range of 50 to 100° C., preferably 55 to 95° C., and more preferably 60 to 90° C., and the surface of the injection mould in contact with the reactive polyurethane mixture to a temperature in the range of 50 to 160° C., preferably 50 to 120° C., further preferably 60 to 110° C., and more preferably 60 to 90° C.

If a foamed polyurethane system with a decorative layer is involved, in an alternative embodiment, the surface of the foaming mould in contact with the thermoplastic polymer composition or with the decorative skin can be heated to a temperature in the range of 20 to 80° C., preferably 30 to 60° C.

The inventive composite components are particularly suitable as an interior or exterior component of a rail vehicle, aircraft or motor vehicle, and as electrical/electronic components.

The composite adhesion between the carrier composed of polycarbonate composition and the polyurethane coating in the inventive composite components, in a preferred embodiment, is at least 1 N/mm, measured on strip samples taken from the component having a width of 20 mm in a floating roller test to DIN EN 1464 with a traversing speed of 100 mm/min.

The polymer compositions used in the process according to the invention comprise:

Component A

Aromatic polycarbonates and/or aromatic polyester carbonates of component A which are suitable in accordance with the invention are known from the literature or preparable by processes known from the literature (for preparation of aromatic polycarbonates see, for example, Schnell, "Chemistry and Physics of Polycarbonates", Interscience Publishers, 1964, and also DE-B 1 495 626, DE-A 2 232 877, DE-A 2 703 376, DE-A 2 714 544, DE-A 3 000 610, DE-A 3 832 396; for preparation of aromatic polyester carbonates, for example DE-A 3 077 934).

Aromatic polycarbonates and polyester carbonates are prepared, for example, by reacting diphenols with carbonic halides, preferably phosgene, and/or with aromatic dicarbonyl dihalides, preferably benzenedicarbonyl dihalides, by the interfacial process, optionally using chain terminators, for example monophenols, and optionally using trifunctional or more than trifunctional branching agents, for example triphenols or tetraphenols. Preparation is likewise possible via a melt polymerization process through reaction of diphenols with, for example, diphenyl carbonate.

Diphenols for preparation of the aromatic polycarbonates and/or aromatic polyester carbonates are preferably those of the formula (I)

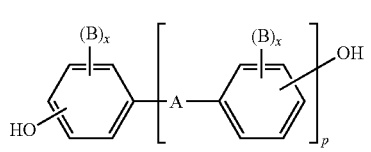

(I)

where

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which may be fused further aromatic rings optionally containing heteroatoms, or a radical of the formula (II) or (III)

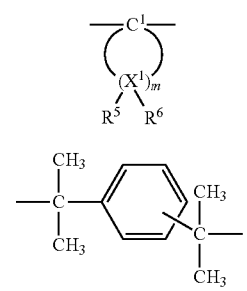

B in each case is $C_1$ to $C_{12}$-alkyl, preferably methyl, halogen, preferably chlorine and/or bromine, x in each case is independently 0, 1 or 2, p is 1 or 0, and $R^5$ and $R^6$ can be chosen individually for each $X^1$ and are each independently hydrogen or $C_1$ to $C_6$-alkyl, preferably hydrogen, methyl or ethyl, $X^1$ is carbon and m is an integer from 4 to 7, preferably 4 or 5, with the proviso that $R^5$ and $R^6$ on at least one $X^1$ atom are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ethers, bis(hydroxyphenyl) sulphoxides, bis(hydroxyphenyl) ketones, bis(hydroxyphenyl) sulphones and α,α-bis(hydroxyphenyl)diisopropylbenzenes, and the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulphide, 4,4'-dihydroxydiphenyl sulphone and the di- and tetrabrominated or -chlorinated derivatives thereof, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane. 2,2-Bis(4-hydroxyphenyl)propane (bisphenol A) is especially preferred.

It is possible to use the diphenols individually or in the form of any desired mixtures. The diphenols are known from the literature or obtainable by processes known from the literature.

Examples of chain terminators suitable for the preparation of the thermoplastic aromatic polycarbonates include phenol, p-chlorophenol, p-tert-butylphenol or 2,4,6-tribromophenol, but also long-chain alkylphenols such as 4-[2-(2,4,4-trimethylpentyl)]phenol, 4-(1,3-tetramethylbutyl)phenol according to DE-A 2 842 005 or monoalkylphenols or dialkylphenols having a total of 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl) phenol. The amount of chain terminators to be used is generally between 0.5 mol % and 10 mol %, based on the molar sum of the diphenols used in each case.

The thermoplastic aromatic polycarbonates may be branched in a known manner, preferably through the incorporation of 0.05 to 2.0 mol %, based on the sum total of the diphenols used, of trifunctional or more than trifunctional compounds, for example those having three or more phenolic groups.

Both homopolycarbonates and copolycarbonates are suitable. For preparation of inventive copolycarbonates of component A, it is also possible to use 1% to 25% by weight, preferably 2.5% to 25% by weight, based on the total amount of diphenols to be used, of polydiorganosiloxanes having hydroxyaryloxy end groups. These are known (U.S. Pat. No. 3,419,634) and are preparable by processes known from the literature. The preparation of polydiorganosiloxane-containing copolycarbonates is described in DE-A 3 334 782.

Preferred polycarbonates are, as well as the bisphenol A homopolycarbonates, the copolycarbonates of bisphenol A with up to 15 mol %, based on the molar sums of diphenols, of other diphenols specified as preferred or particularly preferred, especially 2,2-bis(3,5-dibromo-4-hydroxyphenyl) propane.

Aromatic dicarbonyl dihalides for preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Particular preference is given to mixtures of the diacid dichlorides of isophthalic acid and terephthalic acid in a ratio between 1:20 and 20:1.

In the preparation of polyester carbonates, a carbonic halide, preferably phosgene, is also used as a bifunctional acid derivative.

Useful chain terminators for the preparation of the aromatic polyester carbonates include, apart from the monophenols already mentioned, the chlorocarbonic esters thereof and the acid chlorides of aromatic monocarboxylic acids, which may optionally be substituted by $C_1$ to $C_{22}$-alkyl groups or by halogen atoms, and aliphatic $C_2$ to $C_{22}$-monocarbonyl chlorides.

The amount of chain terminators in each case is 0.1 to 10 mol %, based on moles of diphenol in the case of the phenolic chain terminators and on moles of dicarbonyl dichloride in the case of monocarbonyl chloride chain terminators.

The aromatic polyester carbonates may also contain incorporated aromatic hydroxycarboxylic acids.

The aromatic polyester carbonates may be either linear or branched in a known manner (see DE-A 2 940 024 and DE-A 3 007 934).

Branching agents used may, for example, be tri- or multifunctional carbonyl chlorides, such as trimesyl trichloride, cyanuric trichloride, 3,3',4,4'-benzophenonetetracarbonyl tetrachloride, 1,4,5,8-naphthalenetetracarbonyl tetrachloride or pyromellitic tetrachloride, in amounts of 0.01 to 1.0 mol % (based on dicarbonyl dichlorides used), or tri- or multifunctional phenols, such as phloroglucinol, 4,6-dimethyl-2,4,6-tri(4-hydroxyphenyl)hept-2-ene, 4,6-dimethyl-2,4-6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4-dihydroxyphenyl)propane, tetra(4-[4-hydroxyphenylisopropyl]phenoxy)methane, 1,4-bis[4,4'-dihydroxytriphenyl)methyl]benzene, in amounts of 0.01 to 1.0 mol %, based on diphenols used. Phenolic branching agents may be initially charged together with the diphenols; acid chloride branching agents may be introduced together with the acid dichlorides.

The proportion of carbonate structural units in the thermoplastic aromatic polyester carbonates may vary as desired. Preferably, the proportion of carbonate groups is up to 100 mol %, especially up to 80 mol %, more preferably up to 50 mol %, based on the sum total of ester groups and carbonate groups. Both the ester fraction and the carbonate fraction of the aromatic polyester carbonates may be present in the form of blocks or in random distribution in the polycondensate.

The relative solution viscosity ($\eta_{rel}$) of aromatic polycarbonates and polyester carbonates is preferably in the range of 1.18 to 1.4, more preferably in the range of 1.20 to 1.32 (measured in solutions of 0.5 g of polycarbonate or polyester carbonate in 100 ml of methylene chloride at 25° C.). The weight-average molecular weight Mw of aromatic polycarbonates and polyester carbonates is preferably in the range from 15 000 to 35 000, further preferably in the range from 20 000 to 33 000, more preferably 23 000 to 30 000, determined by GPC (gel permeation chromatography in methylene chloride with polycarbonate as standard).

Component B

According to the invention, component B comprises polyalkylene terephthalates. In a particularly preferred embodiment, these are reaction products of aromatic dicarboxylic acids or reactive derivatives thereof, such as dimethyl esters or anhydrides, and aliphatic, cycloaliphatic or araliphatic diols and mixtures of these reaction products.

Particularly preferred polyalkylene terephthalates contain at least 80% by weight, preferably at least 90% by weight, based on the dicarboxylic acid component, of terephthalic acid radicals and at least 80% by weight, preferably at least 90% by weight, based on the diol component, of ethylene glycol and/or butane-1,4-diol radicals.

The preferred polyalkylene terephthalates may, as well as terephthalic acid radicals, contain up to 20 mol %, preferably up to 10 mol %, of radicals of other aromatic or cycloaliphatic dicarboxylic acids having 8 to 14 carbon atoms or of aliphatic dicarboxylic acids having 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may, as well as ethylene glycol and butane-1,4-diol radicals, contain up to 20 mol %, preferably up to 10 mol %, of other aliphatic diols having 3 to 12 carbon atoms or cycloaliphatic diols having 6 to 21 carbon atoms, for example radicals of propane-1,3-diol, 2-ethylpropane-1,3-diol, neopentyl glycol, pentane-1, 5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di(P-hydroxyethoxy)-benzene, 2,2-bis(4-hydroxycyclohexyl) propane, 2,4-dihydroxy-1,1,3,3-tetramethylcyclobutane, 2,2-bis(4-P-hydroxyethoxyphenyl)propane and 2,2-bis(4-hydroxypropoxyphenyl)propane (DE-A 2 407 674, 2 407 776, 2 715 932).

The polyalkylene terephthalates can be branched by incorporation of relatively small amounts of 3- or 4-hydric alcohols or 3- or 4-basic carboxylic acids, for example according to DE-A 1 900 270 and U.S. Pat. No. 3,692,744. Examples of preferred branching agents are trimesic acid, trimellitic acid, trimethylolethane and -propane and pentaerythritol.

Particular preference is given to polyalkylene terephthalates which have been prepared solely from terephthalic acid and the reactive derivatives thereof (e.g. the dialkyl esters thereof) and ethylene glycol and/or butane-1,4-diol, and mixtures of these polyalkylene terephthalates.

Mixtures of polyalkylene terephthalates contain 1% to 50% by weight, preferably 1% to 30% by weight, of polyethylene terephthalate and 50% to 99% by weight, preferably 70% to 99% by weight, of polybutylene terephthalate.

The polyalkylene terephthalates used with preference preferably have an intrinsic viscosity of 0.4 to 1.5 dl/g, preferably 0.5 to 1.2 dl/g in an Ubbelohde viscometer, measured in dichloroacetic acid in a concentration of 1% by weight at 25° C. to DIN 53728-3. The intrinsic viscosity determined is calculated from the measured specific viscosity×0.0006907+0.063096.

Particular preference is given to using polybutylene terephthalate as component B.

Particularly preferred polybutylene terephthalates have a melt flow rate measured to DIN EN ISO 1133 at 250° C. and a load of 2.16 kg of 9 g/10 min to 60 g/10 min.

The polyalkylene terephthalates can be prepared by known methods (see, for example, Kunststoff-Handbuch [Plastics Handbook], volume VIII, p. 695 ff., Carl-Hanser-Verlag, Munich 1973).

Component C

Component C comprises polybutadiene-based graft polymers or mixtures of butadiene-based graft polymers with butadiene-free vinyl (co)polymers, the butadiene content of component C being at least 40 parts by weight.

Polybutadiene-based graft polymers used in component C comprise

C.1 5% to 60%, preferably 15% to 58% and especially 20% to 55% by weight, based on the graft polymer, of at least one vinyl monomer on C.2 95% to 40%, preferably 85% to 42% and especially 80% to 45% by weight, based on the graft polymer, of one or more polybutadiene-based graft bases.

The graft base C.2 generally has a median particle size ($d_{50}$) of 0.05 to 10.00 µm, preferably 0.1 to 5.0 µm, more preferably 0.2 to 1.0 µm, and most preferably 0.2 to 0.5 µm.

The mean particle size $d_{50}$ is the diameter above which and below which 50% by weight of the particles lie. It can be determined by means of ultracentrifuge measurement (W. Scholtan, H. Lange, Kolloid, Z. and Z. Polymere 250 (1972), 782-1796).

Monomers C.1 are Preferably Mixtures of

C.1.1 50 to 99, preferably 65 to 85, and especially 75 to 80, parts by weight, based on C.1, of vinylaromatics and/or ring-substituted vinylaromatics (such as styrene, α-methylstyrene, p-methylstyrene, p-chlorostyrene) and/or ($C_1$-$C_8$)-alkyl methacrylates such as methyl methacrylate, ethyl methacrylate), and C.1.2 1 to 50, preferably 15 to 35, and especially 20 to 25, parts by weight, based on C.1, of vinyl cyanides (unsaturated nitriles such as acrylonitrile and methacrylonitrile) and/or ($C_1$-$C_5$)-alkyl (meth)acrylates such as methyl methacrylate, n-butyl acrylate, t-butyl acrylate, and/or derivatives (such as anhydrides and imides) of unsaturated carboxylic acids, for example maleic anhydride and N-phenylmaleimide.

Preferred monomers C.1.1 are selected from at least one of the monomers styrene, α-methylstyrene and methyl methacrylate; preferred monomers C.1.2 are selected from at least one of the monomers acrylonitrile, maleic anhydride and methyl methacrylate. Particularly preferred monomers are C.1.1 styrene and C.1.2 acrylonitrile.

Graft bases C.2 suitable for the graft polymers in component C are pure polybutadiene rubbers or mixtures of polybutadiene rubbers or copolymers of polybutadiene rubbers or mixtures thereof with further copolymerizable monomers (for example according to C.1.1 and C.1.2), with the proviso that the glass transition temperature of component C.2 is below <10° C., preferably <0° C., more preferably <−20° C.

The glass transition temperature was determined by means of differential thermoanalysis (DSC) according to the standard DIN EN 61006 at a heating rate 10 K/min with $T_g$ defined as the midpoint temperature (tangent method).

A particularly preferred graft base C.2 is pure polybutadiene rubber.

Particularly preferred graft polymers in component C are, for example, ABS or MBS polymers as described, for example, in DE-A 2 035 390 (=U.S. Pat. No. 3,644,574) or in DE-A 2 248 242 (=GB-A 1 409 275) or in Ullmanns, Enzyklopädie der Technischen Chemie [Encyclopaedia of Industrial Chemistry], vol. 19 (1980), p. 280 ff.

The graft copolymers in component C are prepared by free-radical polymerization, for example by emulsion or suspension polymerization, especially by emulsion polymerization.

In the case of graft polymers in component C which have been prepared in an emulsion polymerization process, the content of graft base C.2 is preferably 20% to 95% by weight, more preferably 40% to 85% by weight, especially 50% to 75% by weight, based in each case on the graft polymer.

The gel content of the graft base C.2 is at least 30% by weight, preferably at least 40% by weight, especially at least 60% by weight, based in each case on C.2 and measured as the insoluble component in toluene.

Since the grafting reaction, as is well known, does not necessarily graft the graft monomers completely onto the graft base, according to the invention, graft polymers in component C are also understood to mean those products which are obtained by (co)polymerization of the graft monomers C.1 in the presence of the graft base C.2 and are also obtained in the workup. These products may accordingly also contain free (co)polymer of the graft monomers C.1 not chemically bonded to the polybutadiene.

The gel content of the graft base C.2 or of the graft polymers in component C is determined at 25° C. in a suitable solvent as the component insoluble in these solvents (M. Hoffmann, H. Krömer, R. Kuhn, Polymeranalytik I und II [Polymer Analysis I and II], Georg Thieme-Verlag, Stuttgart 1977).

The butadiene-free vinyl (co)polymers in component C are preferably butadiene-free homo- and/or copolymers C.1 of at least one monomer from the group of the vinylaromatics, vinyl cyanides (unsaturated nitriles), ($C_1$ to $C_8$)-alkyl (meth)acrylates, unsaturated carboxylic acids and derivatives (such as anhydrides and imides) of unsaturated carboxylic acids.

These (co)polymers C.1 are resinous, thermoplastic and butadiene-free. More preferably, the copolymer is formed from C.1.1 styrene and C.1.2 acrylonitrile.

(Co)polymers C.1 of this kind are known and can be prepared by free-radical polymerization, especially by emulsion, suspension, solution or bulk polymerization. The (co)polymers preferably have average molecular weights $M_w$ (weight-average, determined by GPC) between 15 000 g/mol and 250 000 g/mol, preferably in the range of 80 000 to 150 000 g/mol.

Component D

The composition comprises conventional polymer additives as component D. Possible conventional polymer additives for component D include additives, for example, internal and external lubricants and demoulding agents (for example pentaerythrityl tetrastearate, montan wax or polyethylene wax), conductivity additives (for example conductive black or carbon nanotubes), stabilizers (for example UV/light stabilizers, thermal stabilizers, nucleating agents (for example sodium phenylphosphinate, aluminium oxide, silicon dioxide, salts of aromatic carboxylic acids), transesterification inhibitors, antioxidants, hydrolysis stabilizers), scratch resistance-improving additives (for example silicone oils or hard fillers such as (hollow) ceramic beads), IR absorbents, optical brighteners, fluorescent additives, and also dyes and pigments (for example titanium dioxide, ultramarine blue, iron oxide, carbon black, phthalocyanine, quinacridone, perylene, nigrosin and anthraquinone), or else mixtures of a plurality of the additives mentioned.

In a preferred embodiment, the composition comprises, as component D, at least one additive selected from the group comprising lubricants and demoulding agents, nucleating agents, stabilizers, antistats, dyes, pigments and fillers and reinforcers.

In a further preferred embodiment, the compositions do not comprise any flame retardants or any flame retardant synergists such as anti-dripping agents as component D.

More preferably, the inventive compositions comprise at least one demoulding agent, preferably pentaerythrityl tetrastearate, preferably 0.1 to 1.0 part by weight based on the sum total of components A and B, and at least one stabilizer, preferably a phenolic antioxidant, more preferably 0.01 to 1.0 part by weight of 2,6-di-tert-butyl-4-(octadecanoxycarbonylethyl)phenol based on the sum total of components A and B, and/or an organic phosphorous ester.

Further preference is given to a stabilizer combination of at least two stabilizers, the second stabilizer comprising a Brønsted-acidic compound. Preferably, the second stabilizer is phosphorous acid or acidic phosphates, for example calcium monophosphate.

The additives may be used alone or in a mixture, or in the form of masterbatches.

Polyurethane Layer

The polyurethane layer used is preferably a polyurethane foam or a compact polyurethane layer.

The polyurethanes used in accordance with the invention are obtained by reacting polyisocyanates with H-active polyfunctional compounds, preferably polyols.

In the context of this invention, the term "polyurethane" is also understood to mean polyurethaneureas in which the H-active polyfunctional compounds used are those compounds having N—H functionality, optionally in a blend with polyols.

Suitable polyisocyanates are the aromatic, araliphatic, aliphatic or cycloaliphatic polyisocyanates which are known per se to those skilled in the art and have NCO functionality of preferably >2, which may also have iminooxadiazinedione, isocyanurate, uretdione, urethane, allophanate, biuret, urea, oxadiazinetrione, oxazolidinone, acylurea and/or carbodiimide structures. These can be used individually or in any desired mixtures with one another.

The aforementioned polyisocyanates are based on di- or triisocyanates which are known per se to those skilled in the art and have aliphatically, cycloaliphatically, araliphatically and/or aromatically bonded isocyanate groups, it being unimportant whether these have been prepared using phosgene or by phosgene-free methods. Examples of such di- or triisocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)-cyclohexane, 1-isocyanato-3,3,5-trimethyl-5-isocyanatomethylcyclohexane (isophorone diisocyanate, IPDI), 4,4'-diisocyanatodicyclohexylmethane (Desmodur® W, Bayer AG, Leverkusen, DE), 4-isocyanatomethyl-1,8-octane diisocyanate (triisocyanatononane, TIN), ω,ω'-diisocyanato-1,3-dimethylcyclohexane ($H_6$XDI), 1-isocyanato-1-methyl-3-isocyanatomethylcyclohexane, 1-isocyanato-1-methyl-4-isocyanatomethylcyclohexane, bis(isocyanatomethyl)-norbornane, naphthalene 1,5-diisocyanate, 1,3- and 1,4-bis(2-isocyanatoprop-2-yl)benzene (TMXDI), 2,4- and 2,6-diisocyanatotoluene (TDI), especially the 2,4 and the 2,6 isomer, and technical mixtures of the two isomers, 2,4'- and 4,4'-diisocyanatodiphenylmethane (MDI), polymeric MDI (pMDI), 1,5-diisocyanatonaphthalene, 1,3-bis(isocyanatomethyl)benzene (XDI) and any desired mixtures of the compounds mentioned.

The polyisocyanates preferably have an average NCO functionality of 2.0 to 5.0, preferably of 2.2 to 4.5, more preferably of 2.2 to 2.7, and a content of isocyanate groups of 5.0% to 37.0% by weight, preferably of 14.0% to 34.0% by weight.

In a preferred embodiment, polyisocyanates or polyisocyanate mixtures of the above-specified type having exclusively aliphatically and/or cycloaliphatically bonded isocyanate groups are used.

Most preferably, the polyisocyanates of the above-specified type are based on hexamethylene diisocyanate, isophorone diisocyanate, the isomeric bis(4,4'-isocyanatocyclohexyl)methanes and mixtures thereof.

Among the modified polyisocyanates of relatively high molecular weight, the prepolymers known from polyurethane chemistry which have terminal isocyanate groups and are of the molecular weight range of 400 to 15 000, preferably 600 to 12 000, are of particular interest. These compounds are prepared in a manner known per se by reaction of excess amounts of simple polyisocyanates of the type specified by way of example with organic compounds having at least two groups reactive toward isocyanate groups, especially organic polyhydroxyl compounds. Suitable polyhydroxyl compounds of this kind are simple polyhydric alcohols of the molecular weight range of 62 to 599, preferably 62 to 200, for example ethylene glycol, trimethylolpropane, propane-1,2-diol or butane-1,4-diol or butane-2,3-diol, but especially high molecular weight polyether polyols and/or polyester polyols of the kind known per se from polyurethane chemistry, having molecular weights of 600 to 12 000, preferably 800 to 4000, and having at least two, generally 2 to 8, but preferably 2 to 6, primary and/or secondary hydroxyl groups. It is of course also possible to use those NCO prepolymers which, for example, have been obtained from lower molecular weight polyisocyanates of the type specified by way of example and less preferred compounds having groups reactive toward isocyanate groups, for example polythioether polyols, polyacetals having hydroxyl groups, polyhydroxypolycarbonates, polyester amides having hydroxyl groups or hydroxyl-containing copolymers of olefinically unsaturated compounds.

Compounds which have groups reactive toward isocyanate groups, especially hydroxyl groups, and are suitable for preparation of the NCO prepolymers are, for example, the compounds disclosed in U.S. Pat. No. 4,218,543. In the preparation of the NCO prepolymers, these compounds having groups reactive toward isocyanate groups are reacted with simple polyisocyanates of the type specified above by way of example while maintaining an NCO excess. The NCO prepolymers generally have an NCO content of 10% to 26% and preferably 15% to 26% by weight. It is already clear from this that, in the context of the present invention, "NCO prepolymers" and "prepolymers having terminal isocyanate groups" are understood to mean both the reaction products and the mixtures with excess amounts of unconverted starting polyisocyanates, which are often also referred to as "semiprepolymers".

Useful aliphatic diols having an OH number of >500 mg KOH/g includes the chain extenders customarily used in polyurethane chemistry, such as ethylene glycol, diethylene glycol, propylene glycol, dipropylene glycol, butane-1,4-diol, propane-1,3-diol. Preference is given to diols such as 2-butane-1,4-diol, butane-1,3-diol, butane-2,3-diol and/or 2-methylpropane-1,3-diol. It will be appreciated that it is also possible to use the aliphatic diols in a mixture with one another.

Suitable H-active components are polyols having an average OH number of 5 to 600 mg KOH/g and an average functionality of 2 to 6. Polyols suitable in accordance with the invention are, for example, polyhydroxy polyethers obtainable by alkoxylation of suitable starter molecules such as ethylene glycol, diethylene glycol, 1,4-dihydroxybutane, 1,6-dihydroxyhexane, dimethylolpropane, glycerol, pentaerythritol, sorbitol or sucrose. Starters used may likewise be ammonia or amines such as ethylenediamine, hexamethylenediamine, 2,4-diaminotoluene, aniline or amino alcohols or phenols such as bisphenol A. The alkoxylation is effected using propylene oxide and/or ethylene oxide in any desired sequence or as a mixture.

As well as polyols, it is additionally possible for at least one crosslinker and/or chain extender to be present, selected from the group comprising the amines and amino alcohols, for example ethanolamine, diethanolamine, diisopropanolamine, ethylenediamine, triethanolamine, isophoronediamine, N,N'-dimethyl(diethyl)ethylenediamine, 2-amino-2-methyl(or ethyl)-1-propanol, 2-amino-1-butanol, 3-amino-1,2-propanediol, 2-amino-2-methyl(ethyl)-1,3-propanediol, and alcohols, for example ethylene glycol, diethylene glycol, 1,4-dihydroxybutane, 1,6-dihydroxyhexane, dimethylolpropane, glycerol and pentaerythritol, and also sorbitol and sucrose, or mixtures of these compounds.

Also suitable are polyester polyols as obtainable in a manner known per se by reaction of low molecular weight alcohols with polybasic carboxylic acids such as adipic acid, phthalic acid, hexahydrophthalic acid, tetrahydrophthalic acid or the anhydrides of these acids, provided that the viscosity of the H-active component does not become too great. A preferred polyol having ester groups is castor oil. Also additionally suitable are formulations comprising castor oil, as obtainable by dissolution of resins, for example of aldehyde-ketone resins, and modifications of castor oil and polyols based on other natural oils.

Likewise suitable are those polyhydroxy polyethers of relatively high molecular weight in which high molecular weight polyadducts or polycondensates or polymers are present in finely dispersed, dissolved or grafted form. Modified polyhydroxyl compounds of this kind are obtainable in a manner known per se, for example, when polyaddition reactions (e.g. reactions between polyisocyanates and amino-functional compounds) or polycondensation reactions (for example between formaldehyde and phenols and/or amines) are allowed to proceed in situ in the compounds having hydroxyl groups. Alternatively, it is also possible to mix a finished aqueous polymer dispersion with a polyhydroxyl compound and then to remove the water from the mixture.

Polyhydroxyl compounds modified by vinyl polymers, as obtained, for example, by polymerization of styrene and acrylonitrile in the presence of polyethers or polycarbonate polyols, are also suitable for the preparation of polyurethanes. When polyether polyols which have been modified according to DE-A 2 442 101, DE-A 2 844 922 and DE-A 2 646 141 by graft polymerization with vinyl phosphonates and optionally (meth)acrylonitrile, (meth)acrylamide or OH-functional (meth)acrylic esters are used, polymers of exceptional flame retardancy are obtained.

Representatives of the compounds to be used as H-active compounds mentioned are described, for example, in High Polymers, Vol. XVI, "Polyurethanes Chemistry and Technology", Saunders-Frisch (ed.) Interscience Publishers, New York, London, vol. 1, p. 32-42, 44, 54 and vol. II, 1984, p. 5-6 and p. 198-199.

It is also possible to use mixtures of the compounds enumerated.

The limitation of the average OH number and the average functionality of the H-active component arises particularly from the increasing embrittlement of the resulting polyurethane. In principle, however, the person skilled in the art is aware of the ways of influencing the physical polymer properties of the polyurethane, such that NCO component, aliphatic diol and polyol can be matched to one another in a favourable manner.

The polyurethane layer (b) may be in foamed or solid form, for example as a lacquer or coating.

It can be produced using any of the assistants and additives known per se, for example separating agents, blowing agents, fillers, catalysts and flame retardants.

Assistants and additives for optional use are:

a) Water and/or volatile inorganic or organic substances as blowing agents

Useful organic blowing agents include, for example, acetone, ethyl acetate, halogen-substituted alkanes such as methylene chloride, chloroform, ethylidene chloride, vinylidene chloride, monofluorotrichloromethane, chlorodifluoromethane, dichlorodifluoromethane, and also butane, hexane, heptane or diethyl ether, and useful inorganic blowing agents include air, $CO_2$ or $N_2O$. A blowing effect can also be achieved through addition of compounds that decompose at temperatures exceeding room temperature with elimination of gases, for example of nitrogen, examples being azo compounds such as azodicarbonamide and azoisobutyronitrile.

b) Catalysts

The catalysts are, for example, tertiary amines (such as triethylamine, tributylamine, N-methylmorpholine, N-ethylmorpholine, N,N,N',N'-tetramethylethylenediamine, pentamethyldiethylenetriamine and higher homologues, 1,4-diazabicyclo[2.2.2]octane, N-methyl-N'-dimethylaminoethylpiperazine, bis(dimethylaminoalkyl) piperazines, N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethyl-imidazole, 2-methylimidazole), monocyclic and bicyclic amides, bis(dialkylamino)alkyl ethers, tertiary amines having amide groups (preferably formamide groups), Mannich bases formed from secondary amines (such as dimethylamine) and aldehydes (preferably formaldehyde or ketones such as acetone, methyl ethyl ketone or cyclohexanone) and phenols (such as phenol, nonylphenol or bisphenol), tertiary amines having hydrogen atoms active toward isocyanate groups (e.g. triethanolamine, triisopropanolamine, N-methyldiethanolamine, N-ethyldiethanolamine, N,N-dimethylethanolamine), and the reaction products thereof with alkylene oxides such as propylene oxide and/or ethylene oxide, secondary/tertiary amines, silaamines having carbon-silicon bonds (2,2,4-trimethyl-2-silamorpholine and 1,3-diethylaminomethyltetramethyldisiloxane), nitrogen-containing bases (such as tetraalkylammonium hydroxides), alkali metal hydroxides (such as sodium hydroxide, alkali metal phenoxides such as sodium phenoxide), alkali metal alkoxides (such as sodium methoxide), and/or hexahydrotriazines.

The reaction between NCO groups and Zerewitinoff-active hydrogen atoms, in a manner known per se, is greatly accelerated by lactams and azalactams as well, with initial formation of an associate between the lactam and the compound having acidic hydrogen.

It is also possible to use organic metal compounds, especially organic tin and/or bismuth compounds, as catalysts. Useful organic tin compounds include, as well as sulphur compounds such as di-n-octyltin mercaptide, preferably tin(II) salts of carboxylic acids such as tin(II) acetate, tin(II) octoate, tin (II)-ethylhexoate and tin(II) laurate, and the tin(IV) compounds, for example dibutyltin oxide, dibutyltin dichloride, dibutyltin diacetate, dibutyltin dilaurate, dibutyltin maleate or dioctyltin diacetate. Organic bismuth catalysts are described, for example, in patent application WO 2004/000905.

It is of course possible to use any of the catalysts mentioned above as mixtures. Of particular interest in this context are combinations of organic metal compounds and amidines, aminopyridines or hydrazinopyridines.

The catalysts are generally used in an amount of about 0.001% to 10% by weight, based on the total amount of compounds having at least two hydrogen atoms reactive toward isocyanates.

c) Surface-active additives such as emulsifiers and foam stabilizers

Useful emulsifiers include, for example, the sodium salts of castor oil sulphonates or salts of fatty acids with amines, such as diethylammonium oleate or diethanolammonium stearate. It is also possible to use alkali metal or ammonium salts of sulphonic acids as surface-active additives as well, for instance of dodecylbenzenesulphonic acid or dinaphthylmethanedisulphonic acid or of fatty acids such as ricinoleic acid or of polymeric fatty acids.

Useful foam stabilizers include particularly polyether siloxanes, especially water-soluble representatives. The structure of these compounds is generally such that a copolymer of ethylene oxide and propylene oxide is bonded to a polydimethylsiloxane radical. Of particular interest are polysiloxane-polyoxyalkylene copolymers with multiple branching via allophanate groups.

d) Reaction retardants

Useful reaction retardants include, for example, acidic substances (such as hydrochloric acid or organic acid halides).

e) Additives

Useful PU additives include, for example, cell regulators of the type known per se (such as paraffins or fatty alcohols) or dimethylpolysiloxanes, and also pigments or dyes and flame retardants of the type known per se (for example tris(chloroethyl) phosphate, tricresyl phosphate or ammonium phosphate and polyphosphate), and also stabilizers against ageing and weathering influences, plasticizers and fungistatic and bacteriostatic substances, and also fillers (such as barium sulphate, kieselguhr, carbon black or precipitated chalk).

Further examples of surface-active additives and foam stabilizers, and also cell regulators, reaction retardants, stabilizers, flame-retardant substances, plasticizers, dyes and fillers, and also fungistatic and bacteriostatic substances, for optional additional use in accordance with the invention are known to those skilled in the art and are described in the literature.

EXAMPLES

Component A

Linear polycarbonate based on bisphenol A having a weight-average molecular weight $M_w$ of 28 000 g/mol.

Component B-1

Polybutylene terephthalate having a melt flow rate (MFR) of 49.0 g/10 min, measured to DIN EN ISO 1133 at 250° C. with a load of 2.16 kg.

Component B-2

Polybutylene terephthalate having a melt flow rate (MFR) of 12.0 g/10 min, measured to DIN EN ISO 1133 at 250° C. with a load of 2.16 kg.

Component C

ABS polymer, prepared by emulsion polymerization of 28% by weight (based on the ABS polymer) of a mixture of 24% by weight of acrylonitrile und 76% by weight of styrene in the presence of 72% by weight (based on the ABS polymer) of a particulate crosslinked polybutadiene rubber (median particle diameter $d_{50}$=0.36 μm).

Component D-1

Oligomeric phosphite stabilizer having the structural unit

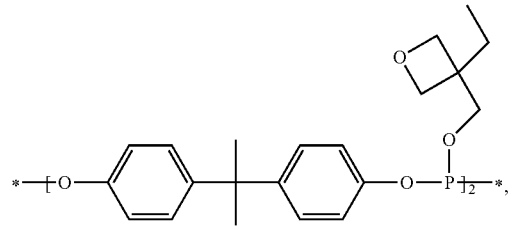

and a weight-average Mw=1150 g/mol in polybutylene terephthalate matrix (15% by weight of stabilizer).

Component D-2

Citric acid is commercially available from Hamann und Reimer.

Component D-3

Phosphorous ester of bis-(2-hydroxy-3-cyclohexyl-5-methylphenyl)methane, commercially available from Rhein Chemie Rheinau GmbH under the Addovate ThermoStab name.

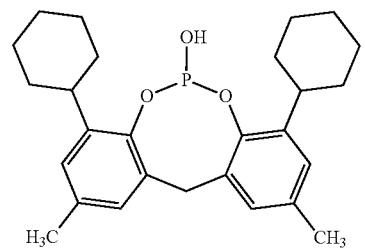

Component D-4

Pentaerythrityl tetrastearate is commercially available as Loxiol VPG 861 from Emery Oleochemicals.

Component D-5

The wax based on a montanic ester is commercially available under the Licowax E trade name from Clariant International Ltd.

Component D-6

Naintsch A3c: ultrafinely ground high-purity talc from Naintsch Mineralwerke GmbH (Graz, Austria).

Component D-7

The black pigment Black Pearls 800 is commercially available from Cabot Corporation.

Reactive Polyurethane Coating System

The polyurethane coating system used was a mixture of Desmophen® XP 2488 (polyol component) and Desmodur® N3600 (polyisocyanate component), both from Bayer MaterialScience AG, Leverkusen, Germany, in a mixing ratio of 1:1.7 parts by weight.

Desmophen® XP 2488 is a branched polyester polyol having a viscosity to DIN 53019 of 13 250 mPa·s at 20° C., a density to DIN 51757 of 1.12 g/cm³ at 20° C. and an OH content of 16.0%.

Desmodur® N3600 is an aliphatic isocyanate based on hexamethylene diisocyanate having an NCO content to DIN EN ISO 11909 of 23.5% by weight, a viscosity at 23° C. to DIN EN ISO 3219/A.3 of 1200 mPa·s and a density at 20° C. to DIN EN ISO 2811 of 1.16 g/cm³.

The crosslinking of the polyurethane coating system was catalysed with a dibutyltin dilaurate (DBTL) commercially available from OMG Borchers GmbH, Langenfeld. The amount added was 0.5 part by weight based on the sum total of polyol component and polyisocyanate component.

Production and Characterization of the Polycarbonate Moulding Compositions

In a twin-screw extruder (ZSK-25) (from Werner and Pfleiderer), the feedstocks listed in Table 1 are compounded at a speed of 220 rpm and with a throughput of 20 kg/h at a melt temperature in the range from 260 to 280° C. and pelletized after cooling and solidification of the melt of the compound.

The pellets resulting from the particular compounding operation are processed in an injection-moulding machine (from Arburg) at a melt temperature of 260° C. and a mould temperature of 80° C. to give test specimens of dimensions 80 mm×10 mm×4 mm.

Unless stated otherwise, the parameters specified in the present application are determined by the following methods:

The ductility of the moulding compositions is assessed using the notched impact resistance value $a_k$ measured on these test specimens to ISO 180-1A at −30° C.

Heat distortion resistance is assessed using the Vicat B120 value measured on these test specimens to ISO 306.

Elongation at break is measured in a tensile test to ISO 527-1,-2 with an extension rate of 50 mm/min.

Modulus of elasticity is measured in a tensile test to ISO 527-1,-2 with a extension rate of 1 mm/min.

The total shrinkage was determined in a method based on ISO 2577, using specimens having the dimensions 150 mm*105 mm*3 mm. The specimens were produced at a melt temperature of 260° C., a mould temperature of 70° C. and a hold pressure of 600 bar. The figure was determined after conditioning the sample at 90° C. in an air circulation oven for 1 hour.

The composite adhesion between the substrate composed of polycarbonate composition and the polyurethane skin is determined on strip samples having a width of 20 mm which were sawn out of the partially PU-coated 2-component composite sheets thus produced, by a floating roller test to DIN EN 1464 with a testing speed of 100 mm/min. The composite adhesion was determined after ageing the samples for 3 or 6 days in a temperature variation test (TVT) (1st cycle: 15 hours at 105° C. followed by 30 minutes at 30° C. followed by 8 hours at −40° C. followed by 30 minutes at 23° C.).

Production of the Composite Components

Partially surface-coated mouldings having a projected area of 412 cm² were produced in an injection-moulding machine in an injection mould having two cavities (a substrate-side cavity and a polyurethane-side coating cavity which was connected to an RIM system). The composite component was a sheetlike component composed of thermoplastic polymer (carrier), the surface of which had been partly coated with a polyurethane layer. The wall thickness of the carrier moulding was about 4 mm. The polyurethane layer thickness was 200 µm.

The process according to the invention for producing the inventive composite components described in the examples is shown in FIG. 1 for better illustration.

In the first process step, the carrier moulding was produced. For this purpose, thermoplastic polymer pellets of the compositions as described in Table 1 were melted in an injection-moulding barrel and injected at a temperature of 270° C. into the first mould cavity of the closed mould (steps 1 and 2 in FIG. 1). This mould cavity was heated to a temperature of 80° C. After the hold-pressure time and cooling time, which led to the solidification of the carrier, had elapsed, the mould was opened in the second process step (step 3 in FIG. 1). This was done by holding the carrier component produced on the ejector side of the injection mould and moving it from the carrier position (step 3 in FIG. 1) together with the mould core into the coating position using a slider (step 4 in FIG. 1). Thereafter, the injection mould was closed again (step 5 in FIG. 1), a clamping force for a maximum pressure of 200 bar was applied and, in the third process step, the solvent-free reactive polyurethane system (see above) was injected into the coating cavity under a pressure of about 30 bar (step 6 in FIG. 1). This was done by conveying the two reactive components of the polyurethane coating system from the RIM system into a high-pressure countercurrent mixing head and mixing them therein prior to injection. The PU-side cavity was heated to a temperature of 80° C. After the end of the injection, the injection nozzle of the polyurethane mixing head was sealed by means of a hydraulic cylinder under a pressure of 50 bar at first, in order to prevent backflow of the coating material. After the reaction and cooling time had elapsed, in the fourth process step, the mould was opened once more (step 7 in FIG. 1) and the coated moulding was demoulded (step 8 in FIG. 1).

TABLE 1

| Component | Unit | Comparison 1 | Comparison 2 | Comparison 3 | Example 1 | Example 2 | Example 3 | Example 4 |
|---|---|---|---|---|---|---|---|---|
| A | | 39.72 | 34.17 | 44.80 | 38.33 | 36.94 | 35.56 | 43.90 |
| B-1 | | | | | | | | 9.64 |
| B-2 | | 46.21 | 39.76 | 41.05 | 44.60 | 42.99 | 41.37 | 26.29 |
| C | | 12.00 | 24.00 | 12.00 | 15.00 | 18.00 | 21.00 | 18.00 |
| D-1 | | 0.97 | 0.97 | 0.95 | 0.97 | 0.97 | 0.97 | 0.97 |
| D-2 | | 0.20 | 0.20 | 0.20 | 0.20 | 0.20 | 0.20 | 0.20 |
| D-3 | | 0.20 | 0.20 | 0.20 | 0.20 | 0.20 | 0.20 | 0.20 |
| D-4 | | 0.40 | 0.40 | 0.50 | 0.40 | 0.40 | 0.40 | 0.20 |
| D-5 | | | | | | | | 0.20 |
| D-6 | | | | | | | | 0.10 |

TABLE 1-continued

| Component | | Unit | Comparison 1 | Comparison 2 | Comparison 3 | Example 1 | Example 2 | Example 3 | Example 4 |
|---|---|---|---|---|---|---|---|---|---|
| D-7 | | | 0.30 | 0.30 | 0.30 | 0.30 | 0.30 | 0.30 | 0.30 |
| Polybutadiene content based on components A to C | | % | 8.6 | 17.3 | 8.6 | 10.8 | 13.0 | 15.1 | 13.0 |
| Butadiene-free vinyl (co)polymer content based on components A to C | | % | 3.4 | 6.7 | 3.4 | 4.2 | 5.0 | 5.9 | 5.0 |
| Adhesion (TVT for 0 days) | DIN EN 1464 | N/mm | >7.0 | >7.0 | >7.0 | >7.0 | >7.0 | >7.0 | >7.0 |
| Adhesion (TVT for 3 days) | DIN EN 1464 | N/mm | >7.0 | >7.0 | 0.23 | >7.0 | >7.0 | >7.0 | >7.0 |
| Adhesion (TVT for 6 days) | DIN EN 1464 | N/mm | 0.17 | >7.0 | n.d. | 0.15 | >7.0 | >7.0 | >7.0 |
| Izod notched impact resistance | ISO 180/1A −30° C. | kJ/m$^2$ | 22 | 49 | 33 | 44 | 45 | 47 | 45 |
| Modulus of elasticity from tensile test | ISO 527-1, -2 23° C. | MPa | 2093 | 1641 | 2116 | 1972 | 1883 | 1740 | 1857 |
| Elongation at break | ISO 527-1, -2 23° C. | % | 145 | 158 | 134 | 142 | 149 | 160 | 145 |
| Vicat | ISO 306 | ° C. | 122 | 114 | 120 | 119 | 119 | 116 | 117 |
| Overall shrinkage | generally ISO 2577 longitudinally | % | 1.14 | 1.18 | 1.05 | 1.03 | 1.15 | 1.15 | 1.12 |
| | widthwise | % | 1.23 | 1.30 | 1.13 | 1.11 | 1.27 | 1.27 | 1.20 | n.d.: not determined; adhesion values >7 N/mm mean that the polyurethane layer cannot be detached from the thermoplastic without destruction.

As apparent from Table 1, Inventive Examples 1-4 exhibit not only a distinct improvement in adhesion to the polyurethane system after a temperature variation test but also constantly high or improved toughness, high heat distortion resistance, high elongation at break values with a high modulus of elasticity and well-balanced shrinkage characteristics. The optimal combination of properties is achieved only when the polybutadiene content based on components A+B+C is within the inventive range and, at the same time, the content of butadiene-free vinyl (co)polymer is likewise within the inventive range. If, as in Comparative Examples 1 and 3, the polybutadiene content and the butadiene-free vinyl (co)polymer content are both too low, the adhesion does not reach the level required in industry. Moreover, notched impact resistance is significantly reduced. If, as in Comparative Example 2, the polybutadiene content is too high, the overall shrinkage does not fulfil the technically acceptable level. Particularly preferred moulding compositions are those for which overall shrinkage does not exceed 1.28% and at the same time the composition adhesion after a temperature variation test for 6 days is >7 N/mm.

The invention claimed is:

1. A composition comprising the following components:
   A) 30 to 45 parts by weight of at least one polymer selected from the group consisting of aromatic polycarbonate and aromatic polyester carbonate,
   B) 32 to 54 parts by weight of at least one polyalkylene terephthalate,
   C) 16 to 23 parts by weight of at least one mixture comprising at least one polybutadiene-based graft polymer and at least one butadiene-free vinyl (co)polymer,
   D) 0.1 to 20.0 parts by weight (based in each case on the sum total of the components A to C) of at least one polymer additive,
   where the polybutadiene content based on the sum total of the parts by weight of the components A to C is 8% to 18% by weight,
   and where the total content of butadiene-free vinyl (co) polymer from the component C based on the sum total of the parts by weight of the components A to C is 3% to 12% by weight, and where the sum total of the parts by weight of the components A to C in the composition is normalized to 100.

2. The composition according to claim 1, wherein
   A) 32 to 45 parts by weight of at least one polymer selected from the group consisting of aromatic polycarbonate and aromatic polyester carbonate,
   B) 32 to 50 parts by weight of at least one polyalkylene terephthalate,
   C) 17 to 22 parts by weight of at least one mixture comprising at least one polybutadiene-based graft polymer and at least one butadiene-free vinyl (co)polymer,
   D) 0.2 to 15.0 parts by weight (based in each case on the sum total of the components A to C) of at least one polymer additive,
   where the polybutadiene content based on the sum total of the parts by weight of the components A to C is 9% to 17% by weight,
   and where the total content of butadiene-free vinyl (co) polymer from the component C based on the sum total of the parts by weight of the components A to C is 4% to 11% by weight, and where the sum total of the parts by weight of the components A to C in the composition is normalized to 100.

3. The composition according to claim 1, comprising
   A) 35 to 45 parts by weight of at least one polymer selected from the group consisting of aromatic polycarbonate and aromatic polyester carbonate,
   B) 32 to 45 parts by weight of at least one polyalkylene terephthalate,
   C) 18 to 21 parts by weight of at least one mixture comprising at least one polybutadiene-based graft polymer and at least one butadiene-free vinyl (co)polymer,
   D) 0.3 to 10.0 parts by weight (based in each case on the sum total of the components A to C) of at least one polymer additive,
   where the polybutadiene content based on the sum total of the parts by weight of the components A to C is 10% to 16% by weight,
   and where the total content of butadiene-free vinyl (co) polymer from the component C based on the sum total of the parts by weight of the components A to C is 5% to 10% by weight, and where the sum total of the parts by weight of the components A to C in the composition is normalized to 100.

4. The composition according to claim 1,
wherein the component C comprises the following components:
C.1 5% to 60% by weight, based on the component C.1, of at least one vinyl monomer on
C.2 95% to 40% by weight, based on the component C.1, of one or more polybutadiene-based graft bases.

5. The composition according to claim 4, wherein the component C.1 comprises mixtures of
C.1.1 50 to 99 parts by weight, based on C.1, of vinylaromatics and/or ring-substituted vinylaromatics and/or $(C_1-C_8)$-alkyl methacrylates, and
C.1.2 1 to 50 parts by weight, based on C.1, of vinyl cyanides (unsaturated nitriles) and/or $(C_1-C_8)$-alkyl (meth)acrylates.

6. The composition of claim 1,
wherein the component D comprises one or more of thermal stabilizers, demoulding agents, colourants and UV absorbers.

7. The composition of claim 1, wherein the component B is polybutylene terephthalate.

8. A composite component comprising
a) a carrier composed of a thermoplastic composition according to the composition of claim 1
b) at least one polyurethane layer selected from the group of coating materials, foams and compact skins, comprising
at least one polyisocyanate component,
at least one polyfunctional H-active compound, and
optionally at least one polyurethane additive and/or processing aid,
and having a molar ratio of NCO- to H-active groups of 1:1 to 1.1:1.

9. The composite component according to claim 8, wherein the polyurethane layer is a coating material having a layer thickness of 50-300 μm.

10. The composite component according to claim 8, wherein the polyurethane layer is a foam having a layer thickness of 1 mm to 1 cm.

11. The composite component according to claim 8, wherein the polyurethane layer is a compact skin having a layer thickness of 1 mm to 4 mm.

12. A process for producing the composite component according to claim 8, wherein the polyurethane layer has been produced by full polymerization of a reactive polyurethane raw material mixture comprising
at least one polyisocyanate component,
at least one polyfunctional H-active compound, and
optionally at least one polyurethane additive and/or processing aid,
in direct contact with the carrier which has been shaped beforehand from the thermoplastic composition and solidified.

13. A process for producing the composite component according to claim 8,
(i) injecting a melt of the thermoplastic composition into a first mould cavity and then cooling,
(ii) transferring the cooled thermoplastic component into a larger cavity and producing a defined gap thereby,
(iii) the gap which thus results between the thermoplastic component and the mould surface of the enlarged cavity is injected with a reactive polyurethane raw material mixture comprising
at least one polyisocyanate component,
at least one polyfunctional H-active compound, and
optionally at least one polyurethane additive and/or processing aid,
the polyurethane raw material mixture polymerizing fully in direct contact with the surface of the thermoplastic carrier to give a compact polyurethane layer or to give a polyurethane foam layer,
(iv) the composite component is demoulded from the mould cavity, wherein (i) to (iv) following one another in immediate succession.

14. The process according to claim 13, wherein, in (iii) the surface of the injection mould in contact with the thermoplastic composition is heated to a temperature in the range of 60 to 90° C. and the surface of the injection mould in contact with the reactive polyurethane mixture to a temperature in the range of 60 to 90° C.

15. The composite component according to claim 8 capable of being used as an interior or exterior component of a rail vehicle, aircraft or motor vehicle or of an electrical/electronic component.

16. The composition according to claim 5, wherein the component C.1.1 comprises at least one of styrene, α-methylstyrene, p-methylstyrene, and p-chlorostyrene.

17. The composition according to claim 5, wherein the component C.1.1 comprises at least one of methyl methacrylate and ethyl methacrylate.

18. The composition according to claim 5, wherein the component C.1.2 comprises at least one of acrylonitrile and methacrylonitrile.

19. The composition according to claim 5, wherein the component C.1.2 further comprises at least one of anhydrides and imides.

20. The composition according to claim 5, wherein the component C.1.2 further comprises at least one of maleic anhydride and N-phenylmaleimide.

21. The composition according to claim 3, wherein the aromatic polycarbonate based on bisphenol A and has a weight-average molecular weight in the range of 23,000 to 30,000 grams per mole and wherein the component B is polybutylene terephthalate.

22. A composition consisting of the following components:
A) 30 to 45 parts by weight of at least one polymer selected from the group consisting of aromatic polycarbonate and aromatic polyester carbonate,
B) 32 to 54 parts by weight of at least one polyalkylene terephthalate,
C) 16 to 23 parts by weight of at least one mixture comprising at least one polybutadiene-based graft polymer and at least one butadiene-free vinyl (co)polymer,
D) 0.1 to 20.0 parts by weight (based in each case on the sum total of the components A to C) of at least one polymer additive,
where the polybutadiene content based on the sum total of the parts by weight of the components A to C is 8% to 18% by weight,
and where the total content of butadiene-free vinyl (co)polymer from the component C based on the sum total of the parts by weight of the components A to C is 3% to 12% by weight,
and where the sum total of the parts by weight of the components A to C in the composition is normalized to 100.

* * * * *